Figure 1:
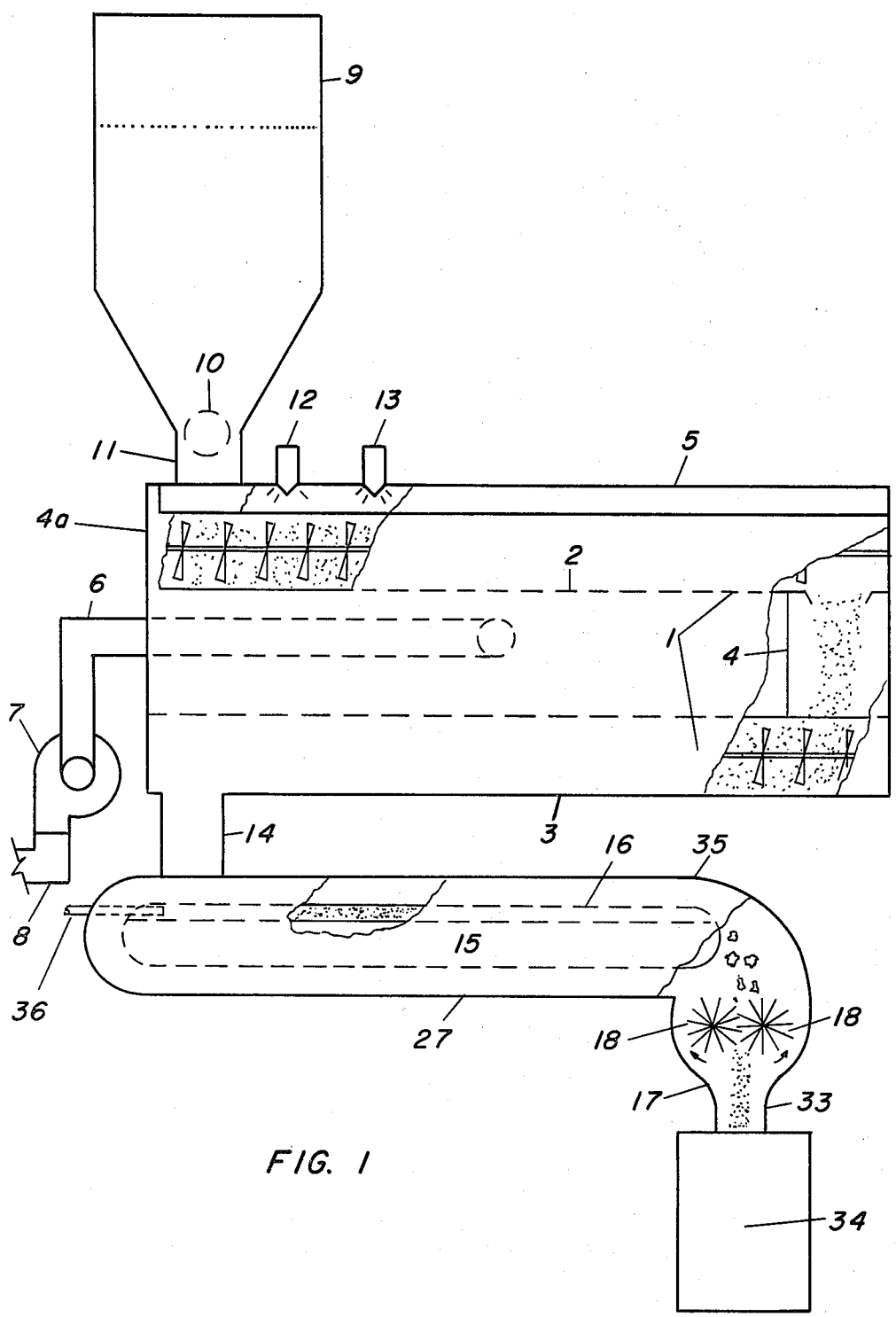

United States Patent [19]

Porter et al.

[11] 4,394,845
[45] * Jul. 26, 1983

[54] SEED COATING APPARATUS

[75] Inventors: Frederic E. Porter, St. Louis; James M. Scott, Minneapolis, both of Minn.

[73] Assignee: Sandoz Ltd., Basel, Switzerland

[*] Notice: The portion of the term of this patent subsequent to Dec. 9, 1997, has been disclaimed.

[21] Appl. No.: 346,282

[22] Filed: Feb. 5, 1982

Related U.S. Application Data

[62] Division of Ser. No. 191,528, Sep. 29, 1980, abandoned, which is a division of Ser. No. 73,882, Sep. 10, 1979, Pat. No. 4,238,523.

[51] Int. Cl.³ .............................................. A01C 1/06
[52] U.S. Cl. ................................................... 118/303
[58] Field of Search .................. 118/303; 47/57.6; 427/212, 4, 221; 264/117

[56] References Cited

U.S. PATENT DOCUMENTS 3,545,129 12/1970 Shreiber .................................. 427/4

Primary Examiner—Sam Silverberg
Attorney, Agent, or Firm—Gerald D. Sharkin; Richard E. Vila

[57] ABSTRACT

Plant seeds are coated by applying a coating composition over the entire seed surface, intentionally agglomerating the seeds in a static mass and then breaking up the agglomerated seeds during the time span in which the seeds can be promptly again accumulated without agglomerating and in which said breaking up can be effected without causing the coatings to suffer substantial rupture damage which would occur if said breaking up was delayed closer to the point of final cure of the coating composition. The process is particularly useful in producing seeds coated for purposes of delaying germination.

5 Claims, 3 Drawing Figures

SEED COATING APPARATUS

This is a division of application Ser. No. 191,528, filed Sept. 29, 1980, now abandoned which in turn is a division of application Ser. No. 73,882, filed Sept. 10, 1979, now U.S. Pat. No. 4,238,523.

The present invention relates to the coating of plant seeds, and more particularly to the application of coatings of the sealing type, eg. designed to delay germination.

Interest in the coating of plant seeds to delay their germination and methods of doing so are recorded in the literature, including U.S. Pat. No. 3,621,612. The method of coating to delay germination as reflected in said patent and as otherwise known to date work fairly well to accomplish the desired result, at least in terms of ability to produce seeds having a relatively predictable germination delay.

However, all of the processes known to us to date suffer from the serious drawback of the need to be carried out under rather precise conditions designed to ensure that the coating developed on the seed will be effective to delay germination. In this regard, it is imperative that the coating completely cover or seal the entire seed surface area in order to delay moisture penetration and hence germination of the seed. On the other hand, the materials used for such coating generally involve coating solids in a liquid carrier and are either adhesive coating compositions or perform as such in the sense of forming the desired coating by passing or curing through an essentially tacky state to a dry or completely cured state. It is thus evident that a plurality of seeds having a coating in the tacky state will stick together or agglomerate if brought in contact with each other. If the agglomerates reach the point of essentially complete cure of the coating, they cannot be broken up or the seeds separated without causing the coating to rupture which of course destroys the primary objective of producing seeds which will have a delayed germination time. It is this drawback which has resulted in a serious problem in producing delayed germination seeds in the sense of placing serious limitations on the processes for their production, for example, by accepting damage rates so high that use of the seeds involves uncertainties as well as added costs. Since final cure time can be substantial for the suitable coating systems, greater than 10 minutes with the faster curing systems, the size of the necessary equipment, building structures to house the same and capital investment to provide the equipment and housing are so great that this single drawback by itself has greatly discouraged the production of delayed germination and similar seeds on a large scale.

Various attempts to solve the problem in question have failed. It seemed rather obvious to solve the problem by continuous mixing of the seeds in a seed mass until final cure had been effected but it was found that this technique nevertheless, and perhaps surprisingly, still resulted in the production of a large and excessive number of seeds having a ruptured coating. The reasons for failure of this approach may not be fully understood but it appears clear that the constant contact and separation of the coated seeds prior to complete cure can cause the coating on one seed to pull away the coating from another, at least at one or more time stages during the curing process, and the possibility of slight differences in the advancement of curing among individual seeds may be a factor in the failures which have been encountered. This approach to the problem also resulted in the additional problem of causing more or less substantial damage to many types of seeds due to the forces applied in keeping the seed mass in a constantly agitated state. Another proposal for solution to the problem was to fluidize the freshly coated seeds in a stream of air, the idea again being basically to keep the seeds largely separated and in motion until complete curing was effected, but this technique also resulted in the production of an excessively large number of seeds with ruptured coatings, the reasons for such failure again probably not fully understood although probably similar to those causing failure when the seeds are mechanically mixed.

A major object of the present invention is to provide a new and improved process for producing plant seeds with a coating effective to seal the seed.

Another major object is to provide a process for producing plant seeds with a coating effective to delay germination, which process could be carried out in reduced space and which hence may be utilized in the large scale production of such seeds by reason of reduced operating costs.

Other objects and advantages will be evident from the following description of the invention.

The present invention is based on the discovery that agglomerates of plant seeds coated with compositions effective to produce sealing coatings, essentially undisturbed and held together by reason of the uncured compositions, will reach a time span in the curing process during which the agglomerates may be broken up into individual seeds very satisfactorily and without causing a substantial undesired disruption of the coating on the seeds, and that the individual coated seed from the agglomerates which are broken up or disagglomerated during such time span can be combined or brought together in masse substantially immediately after such separation without again forming any substantial amount of agglomerated seed.

The process of the present invention therefore involves distributing onto a mass of plant seeds a composition curable to produce a delayed germination or other sealing on the individual seeds, mixing said composition treated mass of seeds together to completely coat individual seeds with the curable composition, bringing completely coated seeds from said mass together under sufficiently static conditions to form an agglomerated seed mass before the time when further mixing of the seeds will cause substantial rupture of the coating on the seeds and breaking up the thus agglomerated seeds into individual seeds during the time span in which the seeds can separate without substantial rupture of the coating on the seeds and recombine in a mass without again substantially agglomerating.

It will be evident that the process of the present invention will save considerable space in manufacture by permitting the seeds to be brought together in an agglomerated mass very soon after a full distribution of the sealing composition over the seeds. Also, the seed mass may be kept relatively static after such agglomeration and the agglomerates only need to be broken up once. Further, it is highly desirable to take advantage of the ability of the seeds to be promptly recombined after breaking up of the agglomerates as additional space can be conserved by recombination prior to whatever subsequent steps may be desired, eg. further processing, storage, packaging and the like.

The process of the invention is adapted for both batch and continuous operation but is preferably carried out on a continuous basis. As shown in FIG. 1, continuous operation is suitably carried out in a paddle mill 1 which is a conventional item of equipment and shown schematically in FIG. 1. We prefer to employ two paddle mill sections arranged vertically with respect to each other such that a first horizontal paddle mill section 2 is suspended above a second horizontal paddle mill section 3. The two paddle mill sections are connected by a vertical tunnel 4 at the downstream end of the first section 2 and the upstream end of the second section 3, thus enabling the first section 2 to discharge into the upstream end of the second section 3. Each of the paddle mill sections 2 and 3 is of conventional design having a semi-circular trough typically 10 inches in diameter and a length of six feet. Paddle mill section 2 is covered with a semi-circular hood 5 running the entire length of the section 2 such that the covered trough and connecting tunnel 4 form essentially a closed inter-connected system with the opposite end wall 4a and vertical side walls (not shown) which run the length of the assembly on each side between the two sections. Such closed system is connected at a suitably intermediary point to a pipe 6 which leads to a blower 7 which in turn discharges through a discharge pipe 8 to the atmosphere outside the building in which the equipment is located, or to another appropriate place where solvents may be vented. Seed bin 9 at the upstream end of the first paddle mill section 2 is capable of feeding the uncoated seeds into the trough of the section 2 at the desired rate through a conventional metering roll 10. The seeds from the metering roll 10 pass through a short vertical feeding tunnel 11 which is connected to an opening in the hood 5 in order to assist in maintaining the closed system nature of the operation. A primary spray nozzle 12 is located about 6 inches downstream from the point of discharge of the metering roll 10 and is adapted to distribute the liquid sealing composition onto the seed mass as it is advanced by the rotating paddles of the paddle mill section 2. An optional activating spray nozzle 13 is located about 6 inches downstream from the primary nozzle 12 and is capable of delivering onto the sealing composition coated seeds any polymerization initiator or curing agent which may be desired or required for purposes of commencing or accelerating the cure of the polymer or polymer system in the sealing composition. Both the primary nozzle 12 and optional nozzle 13 are fitted tightly into openings in the hood 5 or otherwise attached to the hood 5 so as to assist in maintaining a closed system operation.

The paddle mill assembly is arranged to provide for gravity discharge of the coated seeds from the downstream end of the second paddle mill section 3 into a vertical discharge tunnel 14 which is placed vertically above a conveyor belt assembly 15. The conveyor belt assembly 15 is of conventional type and is also shown schematically in FIG. 1. The arrangement of the conveyor belt assembly 15 is such that the traveling belt 16 thereof forms a U shaped or more precisely a truncated V shaped trough in which the coated seeds can be piled up and agglomerated in a continuous bulky mass. The conveyor belt 16 is typically about two feet in width when flat and travelling as such beneath the conveyor belt assembly 15. When rising to the top of the belt assembly 15 at its upstream end the belt 16 is guided into its truncated V shaped trough which typically has its flat bottom measuring about 14–16 inches and each of its sides measuring about 4–5 inches. The conveyor belt 16 discharges its burden of agglomerated coated seeds at the downstream end of the conveyor belt assembly 15 and the discharged agglomerated seeds fall into a disagglomerator assembly 17.

Figure 2:
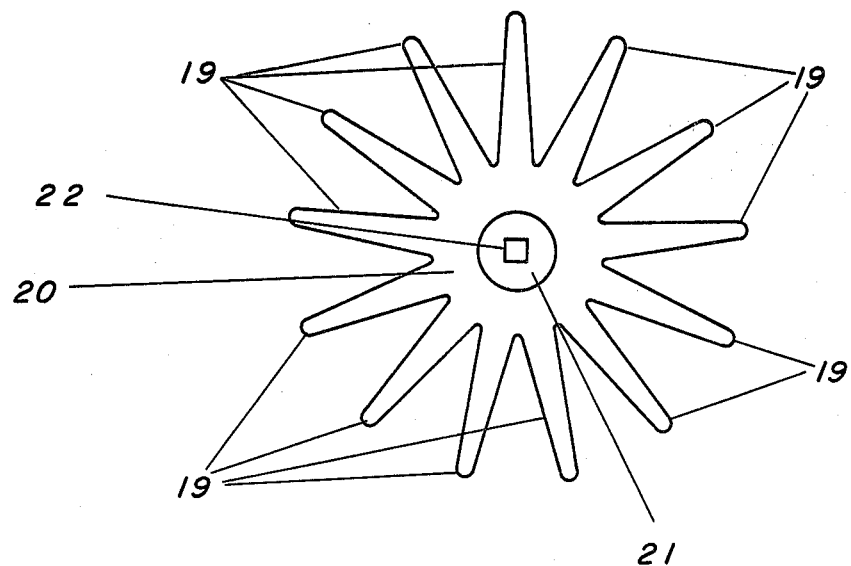
Figure 3:
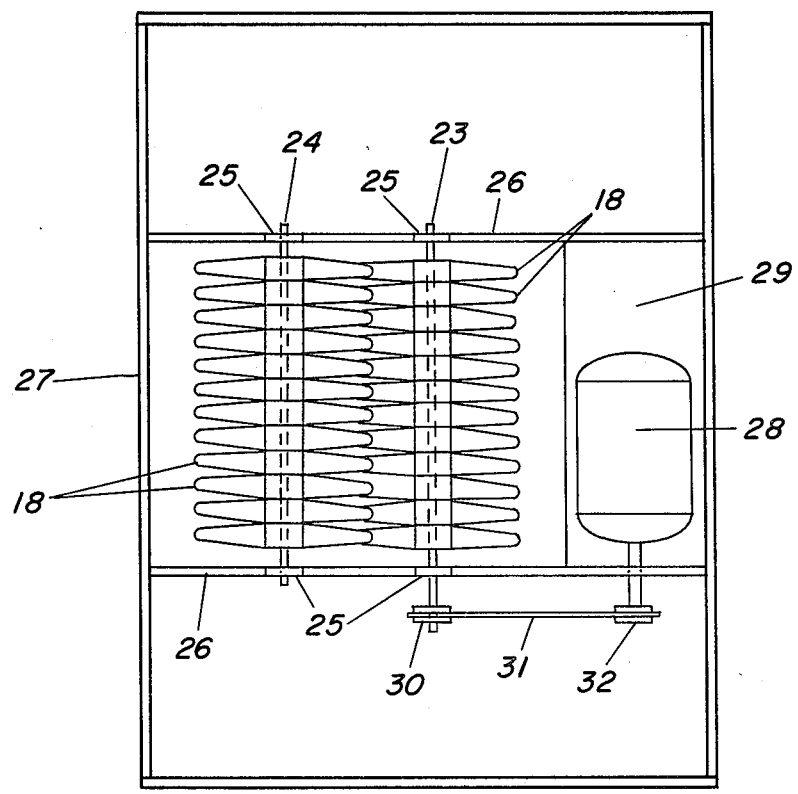

The breaking up or disagglomeration of the seeds in the disagglomerator assembly 17 is suitably accomplished by two sets of intermeshed rubber spoked rimless wheels 18 which are shown in detail in FIGS. 2 and 3. The wheels 18 were actually obtained by us from a discarded corn husking bed and found to suit very well our objective of providing a devise for breaking up agglomerated seed chunks having the condition resulting from the treatments prior to the disagglomeration step. The wheels 18 are of relatively medium hard rubber as conventional in corn husking beds and may be made by standard rubber molding procedures. As shown particularly in FIG. 2, each wheel 18 includes a plurality of rubber fingers 19 which decrease in thickness as they extend from an integral base portion 20 which is integral with a wheel hub 21 which has a square shaft-mounting opening 22. Each wheel 18 is typically about 12.5 inches in diameter and carries typically 13 fingers, as shown in FIG. 2. Each finger is typically about 4.0 inches long and is typically ¾ inch square at its base, and still almost about ½ inch square at a point ¼ inch from its rounded tip. The hub 20 is typically about 2 inches in diameter and about 1.5 inches thick. The diameter of the base portion 20 is therefore typically about 4.5 inches. As shown particularly in FIG. 3, the wheels 18 are mounted on shaft 23 and 24 which may be any suitable shafts adapted to hold the wheels 18 firmly in position to rotate with the shaft under the forces encountered in operation. We currently use a round shaft with 4 metal rods welded thereto to simulate and fit the square configuration of the shaft-mounting opening 22 in the wheels 18. Both shafts 23 and 24 are typically about 24 inches long and are mounted in pillow block bearings 25 which in turn are mounted on 1 inch square bars 26 which in turn are secured to a main frame 27 composed of 1.5 inch angle irons. The main frame 27 is typically about 63 inches long on its side which is parallel to the shafts 23 and 24 and about 46" long on its other side. A motor 28 is mounted on a motor mounting plate 29 which is secured to the bars 26 and said plate 29 extends typically about 13.5 inches from the main frame 27. A sprocket 30 attached to shaft 23 is driven by a chain 31 which is in turn driven by a grear and sprocket assembly 32 attached to the motor 28. The shaft 23 is centered about 13.5 inches from the closet edge of the motor mounting plate 29 and about 10 inches from the shaft 24. The wheels 18 are mounted on the shafts 23 and 24 so that the surface of the hub 21 of one wheel is in abutting contact with the hub 21 of each adjacent wheel 18. Each shaft 23 and 24 carries typically a total of 12 wheels 18. As shown essentially in FIG. 3, the wheels 18 on shaft 23 intermesh with the wheels 18 on the shaft 24, the total distance of overlap being typically 2.5 inches. When arranged as shown and indicated, the sides of the fingers 19 of the wheels 18 on one shaft will come in brushing contact with the sides of the fingers 19 on the wheels 18 on the other shaft. As currently operated by us the wheels on the shafts 24 will counter-rotate relative to the wheels 18 on shaft 23 essentially only by such brushing contact and the inherent driving forces created by the seeds being moved against the wheels 18 on shaft 24 by the driven motion of the wheels 18 on shaft 23. The rotational direction of the shafts 23 and 24 is shown by the arrows in FIG. 1. It will of course be evident that shaft 24 may be also driven by a motor or the like but satisfactory results have been obtained when operated as shown and above-described. The shafts 23 and 24 are located in the disagglomerator assembly 17 typically about 18 inches below the base or trough bottom level of the conveyor belt 16 on its upper passage and otherwise situated so that as much as possible of the seed discharged from the belt 16 will fall by gravity directly into the wheels 18 in the horizontal plane represented by the midpoint of the distance between the two shafts 23 and 24.

The lower portion of the disagglomerator assembly 17 has an opening 33 through which the seeds after the disagglomeration treatment fall largely or exclusively by gravity into a collection or tote box 34.

In order to further facilitate curing and disposal of vapors from the process it has been found convenient to also provide for the removal of such vapors during the transit of the seeds onto and along the conveyor belt 16 and into the disagglomerator assembly 17. For this purpose we essentially enclosed the entire conveyor belt assembly 15 and the otherwise open upper portion of the disagglomerator assembly 17 with a polyethylene film 35 while providing sufficient support (not shown) to enable the film to resist collapse from the more or less slightly negative pressure created within the thus partially enclosed system. Vapors are withdrawn from this section of the operation through a hose 36 suitably fitted through the film 35 and resting on the upper portion of conveyor belt 16 at a location upstream from the point of deposit of the seeds through the tunnel 14, as shown substantially in FIG. 1. The hose 36 may be connected to the pipe 6 or blower 7 or to its own independent and similar purpose blower for discharge of vapors as desired.

In a specific and preferred mode of operation in relation to the apparatus shown in FIGS. 1, 2 and 3, corn seed to be coated to delay its germination is discharged from the bin 9 and metered through the metering roll 10 into the trough of the upper section of the paddle mill 1 at a rate of about 85 pounds per minute. The blower 7 and the same or similar blower attached to the hose 36 are placed in operation and create a slight negative pressure throughout the entire system in order to facilitate removal of water and organic solvent vapors thereby avoiding plant contamination problems but also to effect the important objective of advancing the sealing composition cure rate. The paddle shaft in each of the upper and lower sections of the paddle mill assembly is operated at a speed of 57 rpm and continuously advances the corn seed beneath the primary nozzle 12 from which a polyurea varnish sealing composition is sprayed onto the advancing seeds at the rate of 3 pints of sealing composition for each 100 pounds of seed. The polyurea varnish is a commercially available type polyurea varnish, and more particularly constitutes a 27.3% by solids weight acetone solution of 2 parts by weight of the isocyanate prepolymer and 1 part polyketimine. The advancing seed mass is then treated with water applied from the secondary spray nozzle 13 at the rate of about ½ pint for each 100 pounds of seeds. The continuously advancing seed mass then traverses the remaining distance of the upper portion of paddle mill assembly 1 and is discharged from said upper section at its downstream end. The seeds fall by gravity through the tunnel 4 into the upstream end of the trough at the lower section 3 of the paddle mill assembly. The resulting seed mass then traverses the length of said lower section and is discharged substantially as individual seeds at the downstream end by falling through the tunnel 14 onto the conveyor belt 1 which has already been given its U or truncated V shaped configuration in the area in which the seeds fall onto the belt 16.

The water supplied by the nozzle 13 has the effect of accelerating cure of the polyurea sealing composition and the residence time of the seed mass from the time of application of the sealing composition from the primary nozzle 12 until discharge onto the conveyor belt 16 is designed to achieve two main purposes, namely; (1) provide for sufficient mixing of the seeds to ensure a more or less even distribution and full coating of the sealing composition over the exposed seed surfaces, as well as a good distribution of the water to accelerate cure; and (2) substantially advance a more or less even partial or initial curing of the sealing composition coating on the seeds under the influence of the mixing in the paddle mill and the extraction of acetone and water vapor under the influence of the negative pressure created by the blower 7. However, the paramount objective of the entire paddle mill assembly is to achieve the desired distribution of the sealing composition and water on the exposed seed surfaces and residence time in the paddle mill assembly 1 can be relatively short. Hence, under the conditions of operation being described, the residence time from point of deposit in the upper portion of the paddle mill beneath the metering roll 10 to discharge into the tunnel 14 is typically about 1 minute. Such relatively short residence time in the troughs of the paddle mill assembly represents an important step in the process as it permits the sealing composition and any optional cure accelerating substance to be distributed on the seed surfaces by mixing or other agitation of the seeds without reaching the point where continued agitation would result in ruptures in the final coating as encountered in our experimentation using constant mixing techniques.

The belt 16 is advanced at a rate of typically 2 feet per minute and hence substantially slower than the rate of traverse in the paddle mill. As a result of such differential in rates the seeds falling onto the belt 16 will pile up or accumulate into a mass having a fairly substantial bulk in which most of the seeds are surrounded on all sides by other seeds. Under the conditions of operation being described, a vertical cross-section through the resulting continuous seed mass gives the appearance of a flattened truncated cone reaching a height of about 5–6 inches at its pinnacle. Since the sealing composition is far from cured and still clearly tacky at time of deposition of the coated seeds onto the belt, the piling up or accumulation of the seeds on the belt results in an agglomerated seed mass which has substantial bulk and in which the seeds are held together by the tacky sealing composition. Also, even though the belt 16 advances and carries the seed mass with it, the seed mass itself is essentially static in that the seeds or most all of the seeds constituting the mass are bound together in a substantially undisturbed or fixed relationship to each other by the tacky sealing composition. The static nature of the seed mass as formed on the belt also represents an important step in the process of the invention as the sealing composition is now able to undergo substantial additional curing not only in a relatively compact space but also in substantial absence of extraneous forces which might otherwise cause the seed mass to prematurely disagglomerate or otherwise so disturb the developing coating as to cause ruptures in the finally cured coating.

The deposition of the seeds onto the belt 16 from the tunnel 14 is continuous and hence the resulting seed mass advanced by the belt 16 is a continuous mass. In the operation being described, and at the indicated speed of 2 feet per minute for the belt 16, the residence time of the static agglomerated seed mass on the belt 16 prior to the discharge point at the downstream end of the belt 16 is about 10 minutes. During this traversal time the sealing composition coating the seeds undergoes substantial additional curing and passes into the critical period in which the agglomerated seed mass can be broken up without damage into individual seeds which can then be promptly recombined without agglomeration. Such substantial curing of the sealing composition in the advancing static seed mass is facilitated by the withdrawal of acetone and water vapors from the environment of the seed mass under the influence of the negative pressure within the partially closed system created under the surrounding film 35 by the blower connected to hose 36.

The agglomerated seed mass reaches the downstream end of the conveyor belt assembly 15 where, as typical in the arrangement of such apparatus, the folded up or U shape of the belt 16 collapses or returns rapidly to a flat position just prior to the centerline of the main drive roll (not shown) or about 2–3 feet from the furthest extension of the belt 16 as it passes over the drive or last roll. The seeds in the seed mass at this point have lost substantially all but a small percentage of their volatile liquid content of acetone and water and the sealing coating composition has similarly lost substantially all of its tackiness. Hence, the curing of the sealing composition is at such point considerably advanced but well short of completion and the agglomerated seeds can now be broken up without causing rupture to the coating during such separation. The seed mass itself at such point may be characterized as friable and it is a further advantage, particularly when thin coatings are being applied, that very little force will have to be used to break up the agglomerated mass into individual seeds. The collapse of the belt 16 therefore usually results in a partial or full collapse or restructuring of the static seed mass into a seed mass which is spread out substantially over the nominal 24 inch width of the belt 16 and which in vertical cross-section resembles a flattened cone. Such collapse and spreading out of the seed mass inherently results in the agglomerated seed mass initially breaking up into smaller masses or chunks of agglomerated seeds and also typically into some individual seeds. Such partially broken up seed mass in the form of agglomerated chunks of various size and some individual seeds is continuously discharged by the belt 16 at the downstream end of the conveyor belt assembly and falls by gravity into the disagglomerator assembly 17 and into the space between the opposing sets of wheels 18 formed on the shafts 23 and 24. The driven shaft 23 is rotated typically at a speed of 95 rpm. The fingers on the wheels thus come into shearing force contact with the seed mass resulting in the same being disagglomerated or broken up substantially entirely into individual seeds which then pass through the opening 33 and into the collection or tote box 34 where the seeds accumulate in masse but will no longer agglomerate.

It will be evident from the foregoing detailed description of a preferred mode of operation of the process of this invention that a number of variable parameters primarily related to the curing characteristics of the sealing composition have been balanced or otherwise set in order to obtain the desired objectives and meet all necessary processing steps within the specific equipment described herein and illustrated in the drawings. It will thus be further readily apparent that any desired practice of the invention should be preceeded by a determination of the curing characteristics of the sealing composition to be used, the conditions of operation to be employed to influence the curing and the design of the equipment as required to ensure that the processing steps necessary to accomplish the invention will be effective in operation of the equipment relative to the curing rate of the sealing composition under the conditions of operation. Hence, in such preferred mode of operation detailed hereinabove, we have selected a polyurea varnish system of a type which can be cured fairly quickly among the wide variety of types of sealing compositions which may be used. The slightly reduced or negative pressure created in the system, while designed to accomplish the desirable objective of removal of potentially noxious vapors from the operating area, also has the effect and benefit of accelerating the cure of the sealing composition. Water curable polyurea varnish systems are actually curable by atmospheric moisture but the addition of water as effected in the hereinabove described operation also has the effect of accelerating the cure of the sealing composition, and is hence preferred. It is also indicated that the addition of water has some beneficial effect in facilitating the transport of the seed masses through the process and in the breaking up of the agglomerated seed mass. Other conditions which accelerate cure may also be employed alone or in conjunction with others. For example, heat usually has a major influence on cure time and may be applied to the system, such as by the use of heated air or other means. However, the application of heat can substantially increase the cost of operation. In our preferred mode of operation we have therefore largely or simply selected those processing conditions suitable to effect a desirable acceleration of time cure, as well as other benefits, while omitting others such as heating where the costs might outweigh the benefits. In any event, the conditions are established to meet the processing step objective of being able to mix the seeds together to ensure a complete coating thereof prior to the time that further mixing of the seeds would cause a rupture of the coating in the sense that the rupture would be permanent and appear more or less as a rupture in the ultimate finally cured product. There is generally no substantial risk of being unable to complete the full coating of the seeds with essentially any type sealing composition prior to the time mixing should be ceased, unless the mixing process is deliberately interrupted or accidently shut down. In general, it is indicated that use of the preferred polyurea sealing composition and similar faster cure systems can provide a fair amount of leeway in the ability to mix the seeds prior to time mixing should be ceased, and hence mixing may be continued if desired in such cases well beyond the time necessary to completely coat the seeds. Observations tend to indicate that continued mixing of the seeds after application of the liquid sealing composition may result in some rupture damage which increases more or less slowly in amount with time but stays well with a minor or de minimus level for a reasonable period. The time by which mixing of the seeds must be stopped and the seeds accumulated in the static mass is typically indicated essentially by the point at which continued mixing results in a major or sharp increase in the rate at which ruptures are caused. It has also been observed that sealing compositions appear to pass through various phases of cure and that the transition from one phase to another will essentially also indicate the point at which mixing is to be stopped to avoid substantial rupture. With sealing compositions typically represented by the polyurea systems, other varnishes and the like, particularly those yielding a clear or translucent coating, the compositions at time of application to the seeds are of low to medium viscosity and then become more viscous and honey-like followed by a stage in which the composition becomes rubbery and tearable. After substantial additional curing the composition loses its tackiness but remains well short of final cure as typically indicated by a cloudiness in the coating which is often greater when water has been added to facilitate curing. It has been observed that the progression from the more viscous or honey-like stage to the tearable or rubbery stage of the composition is accompanied by a substantial increase in undesired rupturing indicating that the point for cessation of mixing has been passed. Thus, mixing may be continued up to the point beyond which substantial rupture will result. However, there is generally no particular advantage in doing so and the objectives of the invention, particularly in continuous operation, are best served by effecting an accumulation en masse of the tacky seeds as soon as possible or substantially upon assurance that complete coating of the seed with the sealing composition has been achieved. In addition to avoiding whatever minor damage may be caused by excess mixing, the accumulation of the seed substantially upon completing of the coating step will usually result in savings in equipment and/or processing time. Thus, it is typically the case that the mixing operation takes place in more expensive equipment having a lesser capacity for seed handling than in the case of handling the accumulated seed, such as in the preferred paddle mill and conveyor belt assemblies involved in our preferred continuous operation.

In terms of actual time, and as a practical matter, it is generally desirable where needs permit to employ the faster curing sealing compositions but in any event to effect the formulation of the accumulated static mass in no more than 5 minutes from the time the sealing composition is first applied to the seeds, preferably in no more than 3 minutes. The particularly desirable operations are those in which the coating composition and conditions of operation are selected such that it is required to accumulate the coated seeds in no more than 5 minutes in order to avoid substantial permanent rupture damage of the coating. Effecting the accumulation of the seeds in no more than 2 minutes is particularly preferred and the time span of 2 minutes is judged as an absolute matter to be sufficient to effect a complete coating while allowing for the safe handling relative to the need to avoid substantial rupture in the case of even the faster curing sealing compositions under the various foreseeable practical conditions of operation. We effect accumulation of the seeds in about 1 minute from application of the sealing composition in our preferred mode of operation as detailed hereinabove, and the ability of doing so in even a shorter time is recognized.

After accumulation of the seeds in the agglomerated mass the curing is desirably continued while maintaining the mass undisturbed or static in the sense of being substantially free of shearing forces which would cause separation of the seeds one from the other in the mass or otherwise cause substantial rupture of the coating prior to the critical time for disagglomeration. It will of course be recognized as possible to disagglomerate or again mix the seeds prior to the critical disagglomeration time span but only where the seeds are first agglomerated well before the time at which further mixing will cause undesired rupture of the coating and then also disagglomerated and remixed before such time. However, such mixing or disagglomeration generally offers no advantages, and is indicated as tending in many cases to cause minor but acceptable rupture damage and substantially increasing the risk of unacceptable damage. Hence, the agglomerated seed mass is desirably maintained in a static condition after the first formation thereof.

The critical time span or period in which the agglomerated seed mass may be broken up without undesired rupture and without an ability to reagglomerate on prompt accumulation en masse after such breaking up will, as in the case of the time by which agglomeration is necessary, vary substantially depending upon recognizable factors including particularly the sealing composition employed, thickness of the coating and the conditions affecting its rate of cure. The critical time span is relatively long and is generally indicated to be subject to measurement in terms of hours rather than minutes. Hence, this aspect of the process is subject to considerable flexibility of choice and more than adequate leeway in the avoidance of mistakes. In terms of time on on an absolute basis the critical period is indicated to be at least about 1 hour under the various foreseeable practical modes of operation and is indicated to be typically about 2 to 4 hours under ambient conditions with even the faster curing sealing compositions. As in the case of determining the time by which agglomeration must be effected, the critical period for disagglomeration may be ascertained with assistance of visual and physical examination of curing sealing compositions which all appear to yield recognizable stages of curing as represented by one or more distinct characteristics. Hence, in the host of systems represented by our preferred composition there is a rubbery tearable stage of curing where significant tackiness remains in the coating followed by a stage where all substantial tackiness is lost and a soft coating substantially dry to the touch is formed. This soft cure stage then progresses to the point where the coating has achieved substantial hardness, involving a time of typically 9-15 hours with our preferred polymer system. The attainment of such hard cure stage does not represent the point of final cure which can take several additional hours or even days to accomplish, and it is generally recognized that coated seeds can be readily handled and processed for most purposes as the coating passes to and through the hard cure stage to the final cure stage. However, as will be noted, the critical time during which disagglomeration is to be effected generally occurs well prior to the hard cure stage.

In general, the critical time period for disagglomeration has been entered when the curing of the sealing composition has progressed to the point where the composition has essentially lost its tackiness. However, disagglomeration immediately upon observing such condition of the coating on the visible seeds in the mass may not be appropriate, particularly in the larger masses and/or with heavier coatings, since the condition of the coating on the seeds within the mass may not be apparent and may not have entered the critical period. Hence, a short delay to assure that the critical time has been achieved may be in order and is useful in assuring safe operation. In any event, it will be evident that entry into the critical time span can be readily determined for a contemplated operation by simple and routine experimentation. The ending of the critical time span appears more difficult to ascertain by simple examination of the coating itself as it typically occurs in the substantial period during which the soft cure stage progresses toward the hard cure stage. By way of illustration only, it is indicated that the end of the critical span in our above detailed preferred embodiment employing our preferred polyurea sealing composition occurs approximately 3 hours after entry into the soft cure stage. In any event, it will be evident that the end of the critical time span for disagglomeration may be also determined readily by simple and routine experimentation under the contemplated operation conditions. However, it should be generally unnecessary to determine the end of the critical time span as the period is relatively long and no particular advantage can be foreseen in the unnecessary expenditure of time, equipment and space attendant delaying the disagglomeration beyond the earliest part of the critical period. In this connection, it has been observed that the agglomerated seed mass upon the essential loss of tackiness by the sealing composition or usually shortly thereafter typically becomes friable or otherwise quickly achieves a condition under which the seed mass is most easily broken up entirely into the desired individual seeds. The friability of the seed mass is indicated to increase with time and then decrease. While no determination has been made, it is likely that the friable state resembles a bell shaped curve having a broad crown. It is thus indicated that the friable state itself is a relatively long period and may also be used to assist in determining the entry and end points of the critical time span, but it is to be understood that the friable state is not to be taken as indicated to be fully commensurate with the critical period. It is also thus indicated that the friability of the seed mass increases fairly quickly and it is further indicated that a high degree of friability may be achieved. For example, the existence of preferred conditions within the friable state can be demonstrated by dropping agglomerated seed chunks of about 20–100 seeds onto a smooth concrete surface from a height of 6 feet and ascertaining the singularization of at least 90% of the seeds in each chunk in 4 out of 5 drops. The ability to attain 100% singularization in such exercise indicates conditions of operation in which the disagglomeration step itself may be effected utilizing the shearing force created within an agglomerated seed mass upon dropping onto a hard surface. In any event, effecting the disagglomeration at the earliest time after substantial assurance that the critical period has been entered, and particularly during the friable state, is deemed to represent the more practical and preferred modes of operation of the process of the invention. In terms of actual time it is judged that disagglomeration can and should be effected in no more than 25 minutes from the loss of tackiness throughout the agglomerated seed mass to be broken up under most all foreseen conditions of practical operations, and within no more than 12 minutes in the more practical operations. The most practical and more preferred operations are those in which the friable state is achieved in no more than 10 minutes from the loss of tackiness throughout the seed mass, most preferably within 6 minutes, and disagglomeration effected during such friable state. In our preferred mode of operation as hereinabove described the disagglomeration is effected very completely and readily without substantial rupture or reagglomeration in about 1.5 minutes from the time of entry into the soft cure state. The ability of the seeds to be promptly accumulated or recombined en masse after disagglomeration without thus substantially agglomerating constitutes a desirable feature of the invention as well as definitive limitation in its description. The prompt accumulation contemplated is essentially an instantaneous recombination in the sense of taking place without intentional delay. Such description shall not be taken, however, as a direction on how the process may be operated in its various possible arrangements, and actual recombination may be intentionally delayed for a considerable period or even not effected at all. Hence, it is only important that the seed could be promptly or instantaneously recombined en masse after the disagglomeration. In batch operations conducted for example in a drum or the like an actual recombination will take place immediately or essentially simultaneously upon the cessation or withdrawal of whatever means are employed to break up the seeds. In other operations, particularly of a continuous nature such as that hereinabove detailed, there is usually an instantaneous recombination in the sense that the seeds fall a short distance without delay into the collection box, a matter of up to about 1 second depending largely on the depth of the box and used capacity at the time. It is of course possible to intentionally delay recombination and collection by extending the dropping distance well beyond that necessary, or by other means, but such manipulations appear to offer no special advantage, at least in terms of meeting the fundamental conditions required for operation of the invention. In particular, it has been observed that the drop time or passage through air of the disagglomerated seed plays or need play no part in carrying out the invention. it is conceivable that in particular situations disagglomeration could be effected at the borderline of the critical time and the drop time considerably extended to insure the avoidance of even de minimus agglomeration on collection. However, any such operation would be regarded as extremely risky and in disregard of the safety factors offered by the more practical embodiments of the invention, and particularly because of the potential for falling short of the critical period due to inherent minor variations which might be expected in large scale commercial operations, and the resulting rupture damage and other problems likely to be incurred as a result thereof.

The disagglomeration of the seeds may be effected by the application of forces of essentially any kind as necessary to break up the agglomerated seed mass or chunks of agglomerated seed, as the case may be, into substantially entirely individual seeds. The application of shearing forces is generally effective and preferred, such as by way of milling, dropping, shaking, tumbling, rubbing, hammering and the like. Ultrasonic sound and other sophisticated means may also be employed. It is of course preferred to employ only mild to moderate forces in order to minimize the breakage or other similar type damage normally expected to be encountered in the processing of seed. The ability to usually employ relatively mild forces when the seed agglomerates are in the friable state is another advantage of effecting disagglomeration during such state and employing compositions which achieved such state.

The present invention is deemed applicable to the mass coating of plant seeds in any process employing a polymeric coating material which is intended to completely coat or seal and which is sufficiently exposed at the surface during processing that both continuous mixing and disagglomeration of their accumulated masses prior to final curing will result in rupture damage which can be substantially avoided by disagglomeration of their accumulated masses in a narrower time span between loss of tackiness and final cure. The invention by no means applies to all conceivable compositions useful in seed coating but the more appropriate compositions will be evident to those skilled in the art based on the disclosure herein and in any event can be ascertained by simple, routine experimentation. The polymeric coating material may be water insoluble or water soluble but the process of the invention as a practical matter is more particularly applicable to water insoluble polymer coatings since the water soluble materials generally require very long cure times and are often employed in the manufacture coated seeds of a type not applicable to the invention or more efficiently made by other processes. The polymeric material may constitute essentially the sole solid in the coating composition or may be combined with other materials including not only other polymeric or copolymerization coating forming materials but also other solids for similar or a host of other purposes such as fillers, extenders and the like which influence the basic properties of the coating and/or satisfy other major obectives. The invention may be applied to form a coating layer from a variety of heterogeneous or immiscible solids as used in coating composition that may be employed in the seed coating arts. However, a number of possible filled or heterogeneous compositions do not in their later curing stages produce bonds greater between agglomerated seeds than between the coating and seed base and will not be useful in the invention as not subject to the problems overcome thereby. It is generally contemplated that the invention is of most immediate interest and subject to broad application in the manufacture of seed coated for purposes of delaying germination or of similar type for other purposes. Such coatings are prepared from water insoluble (yet water permeable) polymeric materials which constitute essentially the sole solids in the coating. The sealing compositions useful in forming such coatings may contain minor portions of additives designed to perform specific functions in the storage or use of available products embodying the same such as colloidal and dispersing agents, catalysts, preservatives, dyes and the like, but are considered to consist essentially of the polymeric coating forming material since such additives generally have no significant impact on the function of the final coating. Such sealing compositions may be considered single phase systems in the sense of consisting only one polymeric material or two or more compatible polymeric materials or copolymerization agents which form coatings in which any polymers of distinct chemical nature are intimately miscible or solubilized one in the others. Homogeneous system are those coating compositions consisting essentially of one or more polymeric or copolymerization materials forming a coating which consists of a single polymeric material in the sense of its chemical nature even though the polymer may be of varying molecular weights or degrees of crosslinking. The homogeneous systems are more usually employed in delayed germination coatings. The sealing compositions all contain a liquid carrier in which the polymeric material is dissolved or dispersed, and the carrier may be water or an inert organic solvent as appropriate for the particular system. The organic solvent systems which dissolved the polymeric coating-forming material still remain preferred despite the obvious solvent handling disadvantages. A generally preferred type polymeric coating is represented by the moisture, e.g. water, curable polyureas which are formed from isocyanate prepolymers, more particularly an isocyanate-terminated polyurethane prepolymer, and an amine or amine derivative, e.g. an amine, imine, polyamine or polyimine, preferably a polyketimine. The more preferred systems capable of producing compositions having desirable curing characteristics for use in the invention contain an isocyanate-terminated polyurethane prepolymer and a polyketimine, which are preferably combined in a weight ratio of said prepolymer to polyketimine of from 3:1 to 1.5:1, more preferably 2.5:1 to 1.7:1, and desirably 2:1. Such systems are described in U.S. Pat. No. 4,009,307, the disclosure of which is incorporated herein by reference. Commercial forms such as those mentioned in Example 1 hereinafter are preferably diluted with acetone as the major liquid medium for application in the process. Polyvinyl acetate homopolymers, particularly of high molecular weight, e.g. 300,000 to 1,200,000 by Gel Permeation Chromatography, represent a material of interest and good curing properties for application from aqueous media. The amount of polymeric solids coated on the seeds by the invention process may vary widely depending upon various factors such as the type of seed being coated, thickness of the desired coating and the limitations of established equipment to be used, but is usually in the range of from 0.05 to 5.0 grams per 100 grams of seeds, more usually in the range of from 0.1 to 3 grams per 100 grams of the seed. The polymeric solids content of the sealing composition is usually determined as an appropriate balance between desired viscosity characteristics and curing considerations. The process of the invention is useful in forming a single coating layer over the natural surface of seeds or may be employed to apply a subsequent coating over a similar or different coating previously applied to the seed. Multiple coatings of the same polymer are not uncommon and often preferred in delaying germination.

The process of the invention may be applied to a wide variety coating compositions and practiced in various embodiments disclosed herein or evident to those skilled in the art to produce a variety of seal coated seed products. While such operations may inherently involve extended cure times the more practical aspects of the invention may be realized when the composition coating and conditions of operation are selected such that the breaking up of the seed mass can be and is effected in no more than one hour from the time of first application of the coating composition to the seeds, preferably in no more than 25 minutes and particularly where such total processing time is no more than 15 minutes.

The amount of damage due to rupture of the seed coating essentially due to separation of agglomerated seed in the production of sealed seeds can vary considerably, well above 10%, as indicated in other procedures which we have investigated. The production of seal coated seeds by the process of the present invention is not necessarily free of ruptured seeds but is capable of meeting standards we regard as clearly acceptable including commercial standards, and hence we regard our process as capable of producing seeds substantially free of rupture damage. To the extent necessary to define what is meant by terms such as substantially free and the like as applied to rupture damage we adapt herein an arbitrary standard amount of rupture damage not exceeding 5.0% of the final total seeds subject to germination, even though such standard may be in excess of many commercial production goals. The process normally is readily capable of producing seeds with well less than 3.0% rupture damage, and more typically results in damage in the range of only 0.1 to 2.0%, or in some cases even less damage. We do not count in the determination of rupture damage seed which are damaged in other ways such as by actual breakage or seeds entered into the process and lost by spillage and the like, all as normally encountered in many operations. We do however count as damaged any seeds found still agglomerated in the freshly prepared final product that cannot be separated without rupture damage. The actual determination of rupture may be made by visual examination to ascertain those seeds in which the coating is completely missing to any degree from any portion of the seed such that any portion of the surface area prior to coating can be said to be exposed to the atmosphere. The determination should be made with respect to several representative samples having each a suitable number of perhaps 50–100 seeds. Where the coating being applied is for purposes of delaying germination the determination may also be made by planting the seeds and determining to a reliable statistical variation of say ±0.5% the number of seeds in which the coating was ineffective to delay germination, using control plots of uncoated seeds from the same seed lot to eliminate any variations due to factors other than the success of the coating operation.

The terms sealing and coating are to some extent used interchangeably herein but the term sealing shall be taken as indicating those coatings which completely cover the seed, such as those necessary to delay germination.

The process of the invention is deemed applicable to the coating of all types of plants including all angrospermous and gymnospermous plant seeds, and advantages offered by the invention may be realized in connection with all such seeds. Seeds judged to be of the most immediate or greater interest for coating by the invention include corn, rice, soybeans, sorghum, sunflower, beans, alfalfa and particularly these and others used in hybrid seed production. Corn is of the greater interest.

In addition to the large scale trial detailed herein above the following laboratory type experiments further illustrate or compare the present invention.

EXAMPLE 1

Inbred sunflower seeds in the amount of 100 grams are placed in a plastic bag and treated with 10 ml. of the polyurea varnish hereinbefore indicated which is a two component system formed by blending of 2 parts by weight of an isocyanate-terminated polyurethane prepolymer obtained from PPG (Pittsburg Plate Glass Company) under the designation PPG No. W23091 and 1 part by weight of a polyketimine obtained from PPG under the designation PPG No. W23092 together with sufficient acetone to form a solution having a solids content of 27.3% by weight. The bag is shaken for 30 seconds to fully coat the seeds and then 0.5 ml. of water is added followed by shaking for an additional 30 seconds. The seeds are then accumulated in a bulky mass in a wire mesh basket and allowed to stand undisturbed for 10 minutes after which the agglomerated seed mass is singularized by hand rubbing to obtain a mass of individual seeds substantially free of rupture damage.

EXAMPLES 1A–1

The experiment of Example 1 is repeated except for the following different variations and with more or less equal success: (A) snap bean seeds and 1 ml. of the varnish are used and the water addition and water distribution steps omitted; (B) snap bean seeds are coated as in A, above, except that the varnish is applied in an amount of 3 ml to the mass of seeds; (C) corn seed coated as in Example 1 is given a second coat; and (D) a third layer coating is applied by coating the product of (C), above.

EXAMPLE 2

A rotatable drum is charged with 10 pounds of corn seed to which there is then applied 136 ml. of the polyurea varnish above described. The drum is rotated for 5 minutes while applying evacuation to strip off the vast majority of the acetone, and 25 ml. of water is then added to the almost solvent free seed followed by rotation of the drum for 1 minute to distribute the water. The drum is then stopped and the mass allowed to rest for 3 minutes after which time the drum is again rotated and the seed mass disagglomerated with manual assistance.

EXAMPLE 3

Corn seed in the amount of 200 grams is placed in a plastic bag and treated with 10 ml. of an aqueous adhesive dispersion formed by diluting 50 ml. of a high molecular weight (Ca 1,000,000) polyvinyl acetate homopolymer obtained from the H. B. Fuller Company under the designation S-6930 (a white glue) with 20 ml. of water. The bag is shaken for 20 seconds to distribute the adhesive completely over the seed surfaces and the seeds then accumulated in a bulky static mass in a wire mesh basket. After 5 minutes it is observed that the mass lost its glossiness and after 10 minutes a friable mass is formed that is then broken up by hand to obtain a mass of individual seeds that is substantially free of rupture damage.

EXAMPLE 4

The experiment of Example 3 is repeated except the coating composition is a toluol based blue plant paint obtained in an aerosol dispensor under the designation Easy Marker Marking Paint from Fox Valley Marking Systems, Inc. The net weight applied by bag measurement before and after application is 14.9 grams in two approximately equal portions over about 2 minutes time followed by the static accumulation. Disagglomeration of agglomerated portions at 6 and 23 hours after agglomeration provides a mass of individual seeds substantially free of rupture damage.

EXAMPLE 5

The experiment of Example 3 is repeated except that the coating composition is formed by mixing equal parts of the commercial white glue, water and 66° Brix sucrose syrup. This coating system is known by use to be slower curing than white glue alone and the agglomerate mass does not lose its gloss until 15 minutes after agglomeration. Separated chunks of lightly bonded seeds from the agglomerated mass are broken up at 6 and 23 hours after agglomeration without rupture damage. In this example, however, it is indicated by observation that the agglomerated mass would not be subject to substantial rupture damage on disagglomeration up to and including the time of final cure, thereby making such coating composition and operation not subject to the present invention. Such observation is in contrast to that made with regard to Example 4 where damage is indicated if disagglomeration is further substantially delayed.

What is claimed is:

1. A seed coating apparatus comprising, in combination, a mill assembly having an upstream end and discharge end and adapted to mix and advance plant seeds, metering means at the upstream end of said assembly and adapted to introduce continuously a measured amount of seeds into said assembly, spray means downstream from said metering means and adapted to apply a curable liquid seed coating composition onto a seed mass advancing in said assembly, conveyor means having an upstream receiving end and a downstream discharge end and adapted to accumulate seeds for advancement thereon as an agglomerated mass, the upstream end of said conveyor means being located in seed receiving relationship to the discharge end of said mill assembly, and a disagglomerator assembly located at the discharge end of said conveyor means in position to receive and adapted to singulate seeds in agglomerated seeds discharged from said conveyor means.

2. The seed coating apparatus of claim 1 which is equipped with means essentially enclosing the same from the atmosphere, such enclosure means being connected to piping means which in turn is connected to blower means, whereby vapors within the enclosure can be discharged to the atmosphere.

3. The seed coating apparatus of claim 2 in which the conveyor means comprises an advanceable belt folded up to a U or trunated V shape substantially from its receiving upstream end to its discharge end.

4. The seed coating apparatus of claim 1, 2 or 3 in which the disagglomerator assembly comprises two sets of intermeshed counterrotable spoked rimless wheels in which the spokes decrease in thickness as they extend outwardly from their bases to their tips.

5. The seed coating apparatus of claim 4 in which the mill assembly comprises two vertically arranged paddle mill sections each having an upstream end and a discharge end, a connecting tunnel in gravity feed relation between the discharge end of the upper paddle mill section and upstream end of the lower paddle mill section and a connecting tunnel in gravity feed relation between the discharge end of the lower paddle mill section and the upstream receiving end of the conveyor means.

* * * * *